United States Patent [19]

Cohen

[11] 4,376,502
[45] Mar. 15, 1983

[54] NESTABLE BASKET FOR USE WITH NESTABLE SHOPPING CARTS AND THE LIKE

[75] Inventor: Melvin Cohen, Franklin Lakes, N.J.

[73] Assignee: Melrose Displays, Inc., Passaic, N.J.

[21] Appl. No.: 303,195

[22] Filed: Sep. 17, 1981

[51] Int. Cl.³ .............................................. B60R 9/00
[52] U.S. Cl. .................... 224/42.43; 40/308; 224/32 R; 224/42.46 R; 280/33.99 A; 280/289 A
[58] Field of Search ................ 40/308; 224/36, 32 R, 224/42.45 R, 42.46 R, 42.43; D34/27, 17; 220/18; 280/33.99 R, 33.99 A, 33.99 F, 289 A, 289 H, DIG. 4; 248/74 PB; 206/223, 575, 579; 229/1.5 R; 101/32, 22, 23; 400/127

[56] References Cited

U.S. PATENT DOCUMENTS

| | | | |
|---|---|---|---|
| D. 209,279 | 11/1967 | Cohen | D34/27 |
| 1,359,329 | 11/1920 | Carson | 224/436 |
| 2,558,372 | 6/1951 | Nidermayer, Jr. | 224/42.46 R |
| 2,633,278 | 3/1953 | Muniz | 224/42.46 R |
| 2,635,797 | 4/1953 | Siebert | 224/42.46 R |
| 2,723,474 | 11/1955 | Minter | 40/16 |
| 2,763,413 | 9/1956 | Felton | 224/42.46 R |
| 2,845,729 | 8/1958 | Baumgart | 40/10 R |
| 2,895,243 | 7/1959 | Hummer et al. | 40/125 |
| 2,918,203 | 12/1959 | Hodgson | 229/1.5 C |
| 3,008,569 | 11/1961 | Murch | 224/42.46 R |
| 3,022,593 | 2/1962 | Sides | |
| 3,024,554 | 3/1962 | Kempher | 40/308 |
| 3,057,506 | 10/1962 | Wetlesen | 220/1 T X |
| 3,082,557 | 3/1963 | Huff | 40/10 R |
| 3,088,236 | 5/1963 | Hendrick | 40/308 |
| 3,195,912 | 7/1965 | Howard et al. | 280/33.99 R |
| 3,197,164 | 7/1965 | Hansen | 248/74 PB |
| 3,262,663 | 7/1966 | Jansson | 248/74 PB |
| 3,287,841 | 11/1966 | Spragg et al. | 40/308 |
| 3,534,973 | 10/1970 | Elliott | 280/33.99 R |
| 3,609,893 | 10/1971 | Routzahn | 40/10 R |
| 3,677,570 | 7/1972 | Heou | 280/33.99 A |
| 3,782,747 | 1/1974 | Hamilton, Jr. | 280/33.99 A |
| 3,936,384 | 2/1976 | Williams | 101/32 X |
| 3,999,774 | 12/1976 | Rehrig | 280/33.99 R |
| 4,024,660 | 5/1977 | Goto | 40/308 |
| 4,217,711 | 8/1980 | Spresser et al. | 40/308 |

FOREIGN PATENT DOCUMENTS

| | | | |
|---|---|---|---|
| 1114235 | 5/1968 | United Kingdom | 206/507 |
| 2025860 | 1/1980 | United Kingdom | 280/33.99 R |

Primary Examiner—Joseph Man-Fu Moy
Assistant Examiner—Gary E. Elkins
Attorney, Agent, or Firm—Weinstein & Sutton

[57] ABSTRACT

An unbreakable basket detachably coupled to a nestable shopping cart, has vertical and horizontal plastic ribs, certain ones protecting a detachably mounted sign on the forward face. The open end of the basket has a continuous rolled rim which enhances structural ridigity of the basket and protects the shopping cart and the sign. The upper end of the basket is mounted to the shopping cart by S-hooks. Recesses in the basket prevent the S-hooks swinging and facilitate assembly and disassembly.

Retainer receiving members arranged along the rearward end snap fittingly receive a plastic retainer securing the basket to the cart and preventing the basket from swinging. The vertical ribs and rolled bumper rim removably receive and support the sign. The basket is tapered to permit nesting during shipment or storage. Advertising material and/or messages are printed on both sides. An angle member along the bottom of the basket behind the sign urges goods away from the sign. The basket floor is aligned at an angle to the horizontal to urge goods away from the sign. The connectors for coupling the basket to a shopping car may be integrally molded with the basket and are joined thereto by thin tear-away strips to facilitate separation preparatory to mounting of the basket upon a shopping cart. The sign may be produced through the use of a hot stamping process which resists damage.

4 Claims, 12 Drawing Figures

NESTABLE BASKET FOR USE WITH NESTABLE SHOPPING CARTS AND THE LIKE

FIELD OF THE INVENTION

The present invention relates to baskets and more particularly to a basket designed for releaseable mounting to a shopping cart for increasing the carrying capacity of the shopping cart and allowing shopping carts to be stored in no greater storage area than is required for storing shopping carts without such baskets and for providing attractive and functional advertising which is protected by the design of the basket.

BACKGROUND OF THE INVENTION

Supermarkets, as well as other retail establishments, both large and small, quite frequently employ wheeled shopping carts freely provided to their patrons to facilitate simple, relaxed movement through the aisles of the retail establishment, allowing patrons to collect relatively large quantities of merchandise within the cart. The cart containing the selected items is then typically brought to a check-out counter where the selected items are paid for, bagged and quite frequently replaced in the shopping carts to facilitate the removal of the purchase from the premises and transportation of the selected items to the patron's vehicle.

Since shopping carts of the type described are rather large, it is extremely advantageous to limit the storage area as much as is practicable to avoid wasting precious store space. This is typically accomplished by providing shopping carts having a tapered configuration from front to rear and having a swingably mounted gate at the rearward end thereof which is pushed upwardly to facilitate insertion of the forward end of a shopping cart. This design permits any number of shopping carts to be nested together to reduce the amount of floorspace required for storage during non-use.

It is an object of the present invention to provide a basket for mounting to the forward end of a nestable shopping cart to thereby increase the overall carrying capacity of the cart without increasing the floorspace required for storage of the nested carts. This was accomplished in the prior art by the provision of a shopping cart attachment formed of wire and having a pair of hooks for joining the top end of the attachment to the top bar of a shopping cart provided at the forward end thereof. Note, for example, U.S. Pat. No. Des. 209,279 issued Nov. 21, 1967 to the present inventor. Messages and/or advertising material were provided by means of a thin metallic plate having its side portions wrapped around two substantially vertically aligned metallic ribs of the basket. The size and location of the shopping cart attachment permit the shopping carts to be nested together in the normal fashion without increasing the floor space required for shopping cart storage. Due to the expense of such metallic basket attachments, the number of ribs employed in the formation of the basket was necessarily kept to a minimum, yielding a basket which is quite limited as to the goods it is capable of storing. In addition, the sign is totally unprotected and is scratched and dented very easily and very quickly, destroying the effectiveness thereof in quite short order. The basket attachment further failed to provide any means for securement of the shopping cart attachment to the shopping cart which assembly prevents unnecessary jostling and/or swinging of the attachment basket. In addition, the design of the prior art basket attachment for shopping carts makes it highly impractical to remove and replace the sheet bearing the advertising and/or message material.

BRIEF DESCRIPTION OF THE INVENTION

The present invention provides a novel basket attachment for nestable type shopping carts and the like which is characterized by comprising a one-piece molded plastic member which is lightweight and yet quite rugged and highly serviceable. The basket is of a lattice type design, comprised of substantially mutually perpendicularly aligned ribs, preferably arranged respectively horizontally and vertically. The basket is open at its upper end and is provided with a floor or bottom preferably having more closely spaced, mutually perpendicular ribs to facilitate the carrying of rather small items. The open upper end of the attachment basket terminates in a continuous rolled rim having a inverted, substantially U-shaped, cross-section. A pair of substantially vertically aligned ribs, arranged along the front wall of the attachment basket, together with the forward end of the floor of the basket, collectively form a three sided frame for slidably receiving and supporting a sign member in the form of a substantially flat, thin guage sheet of either metal, plastic or any other suitable material. The aforesaid vertically aligned ribs along the front wall are each provided with an elongated groove which grooves cooperate to receive the opposite parallel edges of the aforesaid planar sheet permitting the sign to be viewed from both the front and the rear while providing a bumper like protective frame surrounding the exterior surface of the sign.

S-shaped hooks are preferably used for joining the attachment basket to the top forward rib of the shopping cart front wall. An L-shaped recess, cooperating with a downwardly extending opening are integrally molded into the basket, said L-shaped recess serving as a means for guiding one hooked end into the downwardly extending opening and for receiving the intermediate portion of the S-shaped hook to prevent the S-shaped hook from twisting and from swinging, thereby stabilizing the mounting of the attachment basket upon the shopping cart.

The rearward end of the attachment basket floor is provided with a pair of integrally formed elongated projections having bores, each bore being arranged to receive one end of a resilient retainer element having yieldable enlarged ends which compress when inserted into said bores and which thereafter expand to normal size after passing out of the opposite ends of said bores, providing a bottom retainer which prevents the attachment basket from freely swinging, thereby providing a stable, yet releaseable mounting arrangement. The floor of the basket in one alternative embodiment is preferably inclined from front to rear, causing loose items placed within the basket to be urged away from the sign. An inclined member extending across the bottom edge of the sign between the vertically aligned bumper rims framing the sign urges items within the basket and immediately adjacent the sign to move rearwardly, thereby preventing items from leaning against the sign facilitating viewing of the rear surface of the sign.

The basket is preferably molded of a plastic material, such as polyethylene which is substantially unaffected by extremes in temperature. The retainer element and/or hook members may be molded integrally with the molding of the basket in a single operation and are} joined thereto by an extremely thin gauge web which may further be scored to facilitate tearing away of the retainer strip (and/or hook strip) from the basket preparatory to mounting of the basket upon a shopping cart.

To further protect the sign from being scratched or damaged during use, a hot stamping technique is employed to form the sign, wherein characters and other patterns are debossed into the surface of the planar sheet and material such as a plastic foil material, preferably of a contrasting color or colors, is deposited in the debossed regions which are in the form of shallow recesses. The thickness of the plastic material deposited therein is less than the depth of said recesses so that the exposed surfaces of the deposited material is in itself recessed, thereby protecting against being damaged or scratched.

OBJECTS OF THE INVENTION AND BRIEF DESCRIPTION OF THE FIGURES

It is therefore one object of the present invention to provide a novel basket attachment for shopping carts and the like having integrally formed portions thereof serving as bumper means for protecting both the basket and a changeable sign framed by said bumper means.

Another object of the present invention is to provide a novel basket attachment for use with shopping carts and the like having integrally formed means for removably receiving fastening members and for stably retaining said fastening members to prevent moving and/or twisting of the fastening elements as well as the basket attachment.

Still another object of the present invention is to provide a novel basket attachment for shopping carts and the like provided with means for moveably mounting the sign member viewable from both the front and rear of said basket attachment and including means for urging items within said basket away from the sign to permit the sign from being scratched or damaged and to facilitate viewing thereof.

Still another object of the present invention is to provide a basket attachment for use with shopping carts and the like wherein the basket attachment and cooperating fastening elements are integrally formed during a single molding operation and are easily severable from one another by means of an extremely thin tear-away portion to thereby facilitate and simplify packaging, shipment and assembly operations.

The above as well as other objects of the present invention will become apparent when reading the accompanying description of drawings in which.

DETAILED DESCRIPTION OF THE INVENTION

Figure 1:
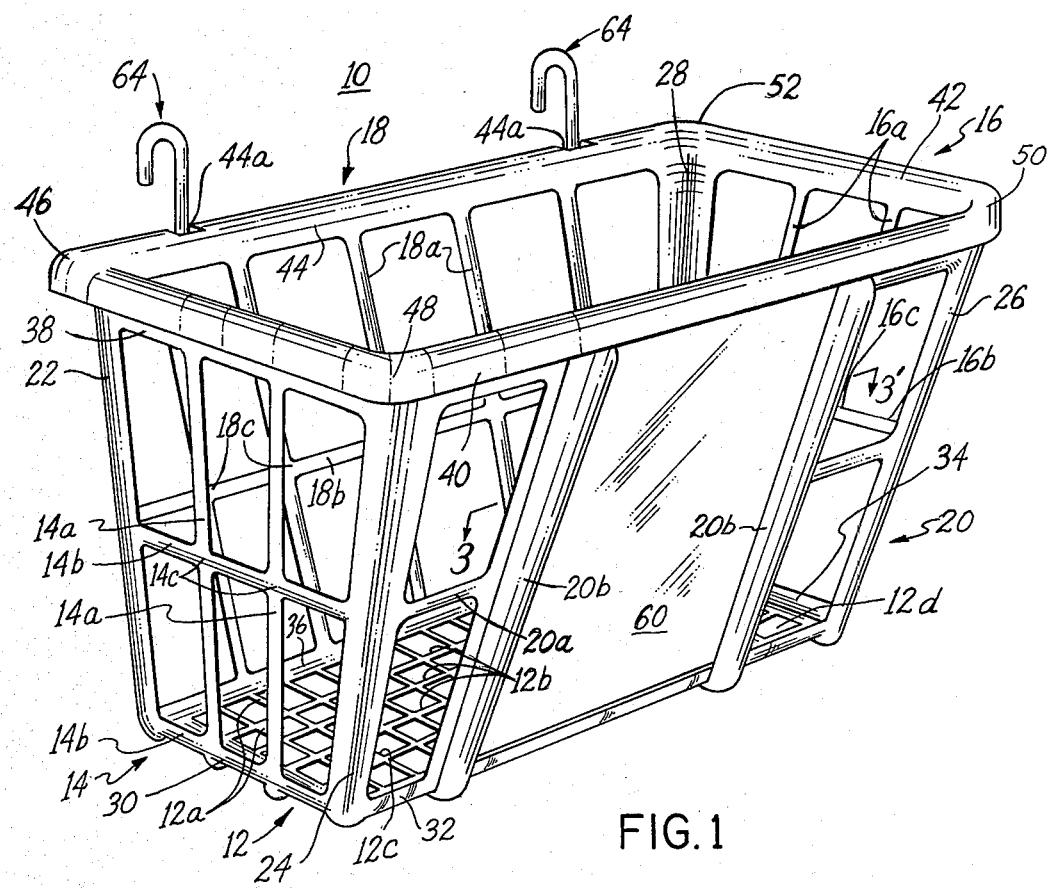
FIG. 1 is a perspective view of the basket showing the front, left and top sides.
Figures 1A, 1B:
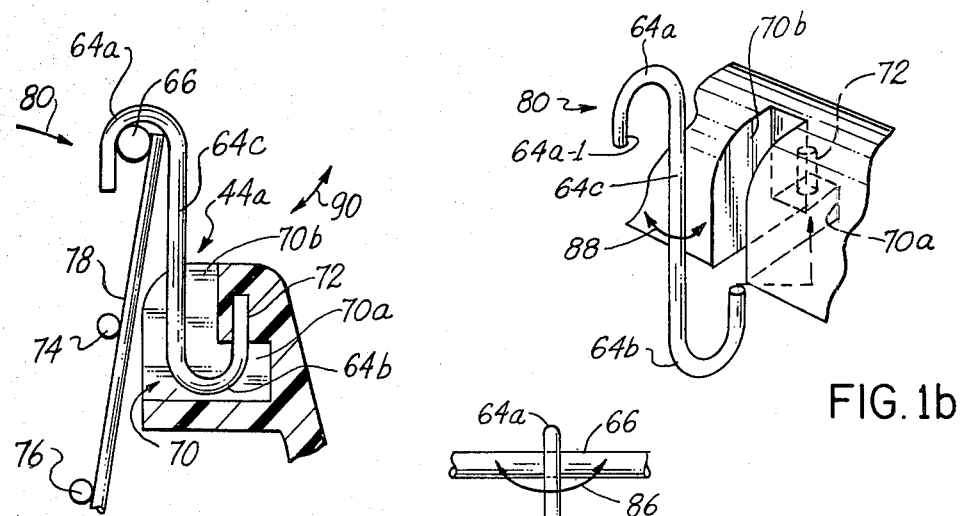
FIG. 1a is a detailed sectional view of one of the hook mounting assemblies of FIG. 1.
FIG. 1b is a detailed perspective view of one of the hook mounting assemblies of FIG. 1.
Figure 1C:
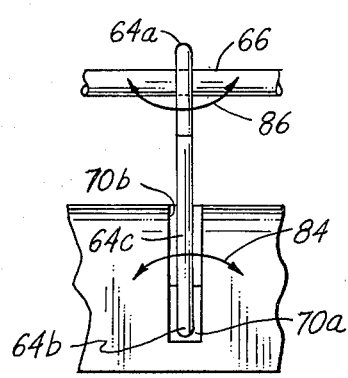
FIG. 1c is a detailed rear elevational view of one of the hook mounting assemblies of FIG. 1.
Figure 2A:
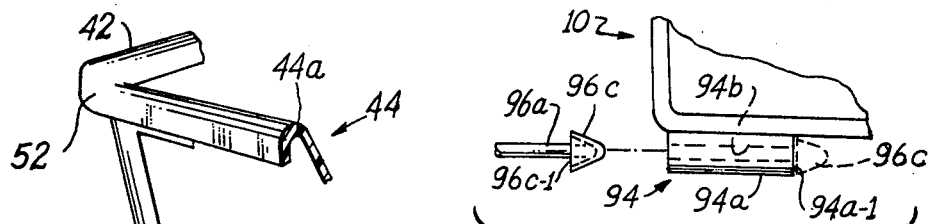
FIG. 2a is a detailed elevational view of one of the retainer receiving members shown in FIG. 2.
Figure 2:
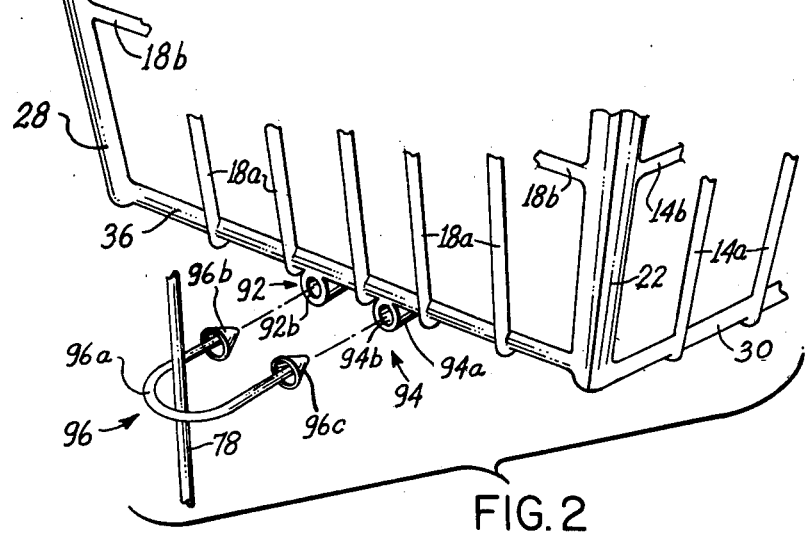
FIG. 2 is a perspective view of the basket of FIG. 1 showing the rear and left-hand sides thereof and with portions thereof removed for simplicity of presentation.

Considering FIGS. 1 and 2, there is shown therein a basket attachment 10 designed in accordance with the principles of the present invention and being a unitary one piece molded member having a floor portion 12, left and right-hand side walls 14 and 16, rear wall 18 and forward wall 20. Floor 12 is provided with a plurality of mutually perpendicularly aligned ribs 12a, 12b which are integrally joined at their intersections 12c, the ribs 12a and 12b forming small rectangular shaped openings 12d. Spacing between the ribs 12a and 12b is sufficiently small to permit small items to be safely deposited within the basket.

Side walls 14 and 16 are comprised of substantially vertically aligned ribs 14a, 16a and horizontally aligned ribs 14b, 16b which are integrally joined to the aforementioned vertically aligned ribs at intersections 14c, 16c, respectively. Rear wall 18 comprises a plurality of vertically aligned ribs 18a integrally adjoined to horizontally aligned ribs 18b at intersections 18c.

Front wall 20 is provided with horizontally aligned rib 20a integrally joined to a pair of vertical ribs 20b, 20b. The horizontally and vertically aligned ribs 14a, 14b and 16a, 16b; 18a, 18b and 20a, 20b of the side walls 14 and 16, rear wall 18 and front wall 20 may be separated by larger spacing distances than the ribs 12a, 12b forming the floor 12 of basket 10.

The curved corner ribs 22, 24, 26, 28 are integrally joined to the horizontally aligned ribs of adjacent walls. For example, corner rib 22 is joined to horizontally aligned ribs 14b, 18b of side wall 14 and rear wall 18, respectively. Each of the corner ribs 22 through 28 has a curved configuration so that their exterior surfaces are convex while their interior surfaces are concave. Ribs 22 through 28 are also greater in width than the vertical ribs forming each side wall. In a similar fashion, the unitary basket attachment 10 is provided with horizontally aligned curved bottom ribs 30, 32, 34, 36, each of which are integrally joined to the vertically aligned ribs of their associated side wall and floor as well as being integrally joined to the lower ends of corner ribs 22 through 28. Ribs 30 through 36 have a curved contour which is concave along their interior surfaces and convex along their exterior surfaces.

Basket attachment 10 has an open upper end defined by upper horizontally aligned ribs 38 through 44, each forming an integral part of an associated wall and being integrally joined to vertically aligned ribs of the associated wall as well as being integrally joined to the upper ends of the corner ribs 22 through 28.

The upper horizontally aligned ribs have an inverted, U-shaped cross-section. Noting, for example, the upper rib 44 the inverted U-shaped cross-section 44a can be seen in FIG. 2 to define a downwardly extending flange whose outer surface extends beyond the outer surfaces of the ribs 18a of the associated side wall 18. Each of the upper horizontally aligned ribs 38 through 44 are integrally joined to one another at their ends, forming the rounded corners 46, 48, 50, 52. The ribs 38 and 42, corners 48, 50 and the front rib 40 collectively form a rolled bumper rim which, due to its inverted U-shaped cross-section enhances the integrity and structural strength of the basket attachment 10 and further serves as a bumper to cushion any impact experienced by the basket attachment 10 during use.

The vertically aligned ribs 20b, forming part of front wall 20, are rounded, raised, ribs which extend outwardly and away from the imaginary planar surface defining front wall 20. These raised ribs, together with the rolled bumper rim 40 extend forwardly of a sign 60 which may provide advertising and/or messages, and serve to protect the sign against being scratched, dented or damaged.

Figure 3:
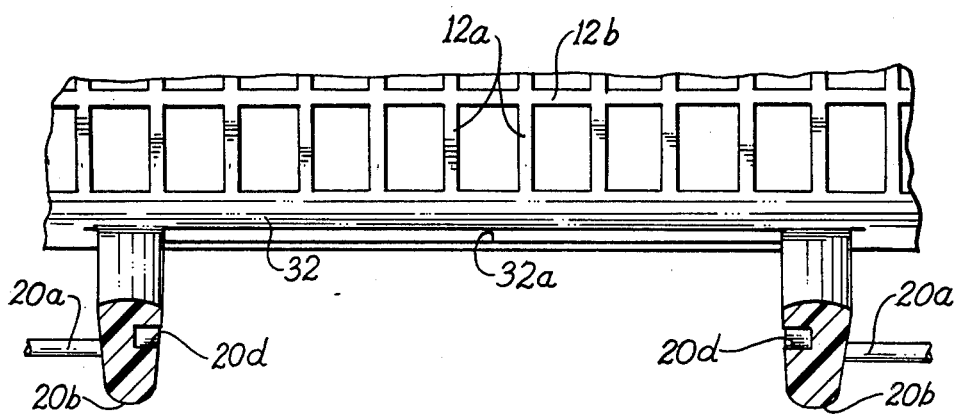
FIG. 3 is a sectional view of the basket of FIG. 1 looking in the direction of arrows 3—3'.

FIG. 3 shows a sectional view of ribs 20b looking in the direction of arrows 3, 3' of FIG. 1. Each of the ribs is provided with an elongated groove 20d for slidably receiving opposing vertical sides of sign 60 which is preferably a rectangularly shaped substantially planar plate of relatively thin guage material and may be formed of wood, plastic, metal or any other suitable material capable of being stamped or pressed or printed upon to carry and hence display a sign and/or message on both the forward and rearward surfaces thereof. If desired, both the sign and the frame receiving the sign can depart from a rectangular shape and can have a trapezoidal shape, for example.

Figure 3A:
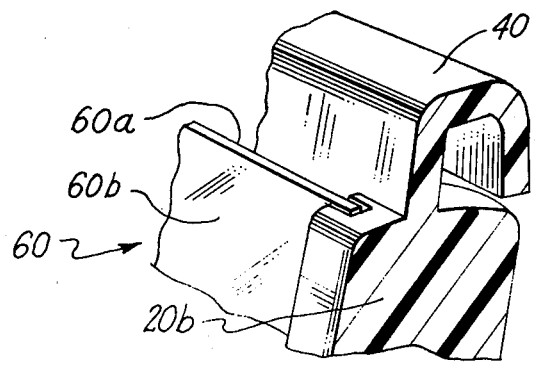
FIG. 3a is a detailed rear perspective view of a portion of the sign holding structure shown in FIG. 1.

The vertically aligned, elongated grooves 20d cooperate with a horizontally aligned groove 32a provided along the upper interior surface of bottom rib 32 and positioned to receive and support the bottom edge of sign member 60. The top edge 60a of sign 60, shown best in FIG. 3a is preferably rounded or smoothed to avoid the possibility of any injury.

Due to the open weave basket design, the rearward surface of sign 60 may be viewed through rear wall 18 of basket attachment 10. The interior portion of each rib 20b extends inwardly as shown best in FIG. 3a to serve as a bumper to protect the interior surface 60b of sign 60 from being damaged.

Figure 3B:
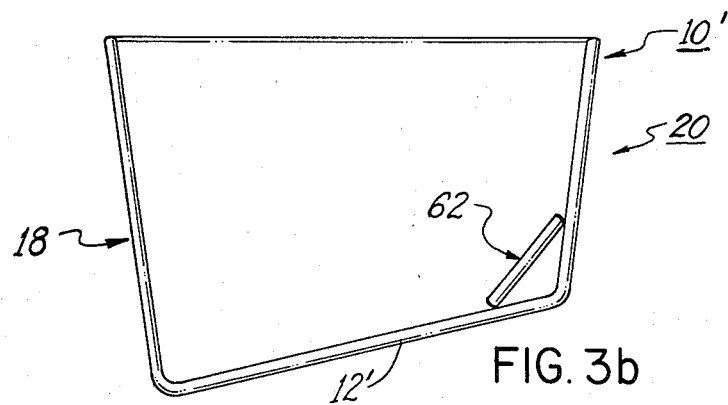
FIG. 3b is a simplified elevational view of another embodiment of the basket of the present invention.

As shown in FIG. 3b, a ramp 62 is provided along the interior side of wall 20, inclined surface 62 extending between ribs 20b and serving to urge articles placed within basket attachment 10 away from sign member 60 to prevent the items placed within basket attachment 10 from obscuring the exterior surface 60b of sign 60. In addition thereto, floor 12' is perferably arranged in an inclined fashion causing items within basket attachment 10 to be urged toward rear wall 18 or alternatively to lean rearwardly so as to cause items within basket attachment 10 to be urged rearwardly or to lean in a rearward direction to facilitate unhindered observation of the rear surface 60b of sign member 60. The inclined floor 12' and ramp 62 may be used together or independently of one another.

Referring to FIGS. 1 and 1a through 1c, the upper horizontal rib 44, extending along the top end of rear wall 18, is provided with a pair of notches 44a, 44a which provide clearance for the S-shaped mounting hooks 64 provided for joining the upper end of basket attachment 10 to the topmost bar 66 provided at the forward end of a shopping cart (not shown for purposes of simplicity). The S-shaped hooks 64 are preferably formed of metal and are each provided with hook-shaped ends 64a, 64b integrally joined with a substantially straight center portion 64c. The upper horizontal rib 44 has a hook receiving arrangement 44a, integrally molded into rib 44 which is comprised of a substantially L-shaped recess 70, having a horizontally aligned recess portion 70a and a vertically aligned recess portion 70b. The downwardly extending opening 72 communicates with the horizontally aligned recess portion 70a and is designed to receive and be supported by the free end of hook portion 64b as shown best in FIGS. 1a and 1b. The hook portion 64b extends substantially into the horizontally aligned recess 70a and opening 72 while the substantially straight central portion 64c of S-shaped mounting hook 64 extends into the vertically aligned portion 70b of recess 70. The upper hook portion 64a is suspended upon the topmost horizontally aligned rib 66 of the shopping cart which may be comprised of additional horizontally aligned ribs 74, 76 joined with vertically aligned ribs, such as, for example, the vertically aligned rib 78.

The free end 64a-1 of upper hook portion 64a is preferably urged inwardly in the direction shown by arrow 80 to cause the upper hook 64a to substantially surround upper horizontal rib 66, preventing basket attachment 10 from being easily removed from the shopping cart.

Vertically aligned recess 70b cooperates with opening 72 to prevent the S-shaped mounting hook member 64 from rotating about the lower end as shown by arrow 84 and also prevents the mounting hook 64 from rotating or swinging about the upper hook shaped member 64a as shown by arrow 86. In addition thereto, the vertically aligned recess 70b further cooperates with opening 72 to prevent the S-shaped mounting hook 64 from rotating about its longitudinal axis represented by dotted line 64c so as to prevent rotation of the S-shaped mounting hook in the direction represented by arrow 88. Thus each L-shaped recess 70 and cooperating opening 72 provided for each of the S-shaped mounting hooks 64 stably mount the basket attachment 10 to the forward end of a shopping cart.

In order to further stabilize basket attachment 10 so as to prevent it from swinging in the direction shown by arrow 90 about the upper horizontal rib 66 of the shopping cart, the basket attachment 10 is provided with elongated, horizontally aligned retainer receiving projections 92 and 94 integrally formed as part of the basket floor 12 and arranged at the rearward end thereof. Since both of the retainer receiving projections 92, 94 are substantially identical, a description of retainer receiving projection 94 will be given hereinbelow, for purposes of simplicity. As can best be seen in FIGS. 2 and 2a, retainer receiving projection 94 has a substantially cylindrically shaped body 94a which is provided with a cylindrical shaped opening or bore 94b extending through the entire length of the body 94. An elongated retainer member 96, preferably formed of a flexible, resilient plastic material, comprises a wire shaped body 96a having enlarged tapered heads, 96b and 96c integrally joined to the free ends of wire-shaped body 96a. The tapered mushroom shaped heads 96b, 96c are compressible and the retainer 96 secures basket attachment 10 to the forward end of a shopping cart in the following manner:

Retainer member 96 is bent into a substantially U-shaped configuration as shown best in FIG. 2 so as to encircle a vertical rib such as for example vertical rib 78 provided at the forward end of a shopping cart. Mushroom shaped cap 96c is brought into alignment with opening 94b and is pressed into said opening. The dimensions of the mushroom shaped cap 96c are greater than the inner diameter of bore 94b, causing the mushroom shaped cap 96c to be compressed as it passes through opening 94b. As soon as the rear end 96c-1 of mushroom shaped cap 96c clears the right hand end 94a-1 of retainer body 94a, mushroom shaped end cap 96c springs back to its normal configuration, thereby serving as a means for locking one end of the retainer member 96 to basket attachment 10. The mushroom shaped end cap 96b is inserted into the retainer opening 92b in a similar fashion and assumes a locking position in a similar fashion thereby locking the lower end of basket attachment 10 to the shopping cart, preventing basket attachment 10 from swinging about upper horizontally aligned rib 66 thereby stably mounting basket attachment 10 and further preventing the items collected therein from being jostled or bounced around. If desired, retainer member 96 may be wrapped one full turn about rib 78.

In the event that it is desired to remove basket attachment 10 from a shopping cart, the plastic retainer element 96 may be cut, and its two halves pushed through the rearward ends of the respective openings 92a, 94a and discarded. Hooks 64 may be removed simply by bending the free ends of upper hook portions 64a back to the positions shown, for example, in FIGS. 1a and 1b. Alternatively, the lower hook portions 64b may be removed from the associated openings 72 each receiving a hook portion 64b, leaving hook portions 64a about horizontal rib 66.

Figure 5:
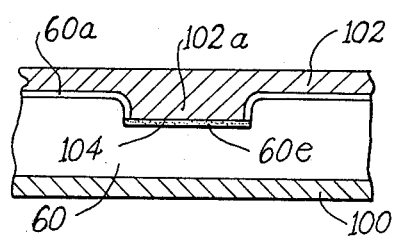
FIG. 5 is a sectional view of a hot stamping apparatus used for forming a sign which may be employed in the basket shown in FIG. 1.

The sign 60 may be formed of a suitable plastic material, the sign 60 being produced by a hot stamping process wherein the sheet 60 is placed upon a support 100 as shown in FIG. 5. A heated member 102 is pressed against the upper surface of sheet 60 and is provided with raised projections such as the projection 102a which is pressed into the top surface of sheet 60 to form a depression 60e which conforms to the shape of projection 102a. A foil sheet 104 of a colored plastic material such as for example mylar is placed against the projection 102a and is heated and fused to the base of recess 60e. The mylar foil 104 is preferably of a color which contrasts with the color of sheet 60. Foil sheet 104 only partially fills the recess 60e so as to be arranged a spaced distance beneath surface 60a. This debossed arrangement serves to protect the mylar foil sheet 104 from being scratched or damaged. It should be understood that the projection 102a may be in the form of numbers and/or letters and/or graphic patterns depending upon the advertising or message information desired to be conveyed to the user. The hot stamping operation may be performed upon both surfaces of sheet 60 at the same time by replacing support member 100 with a heated member having projections and similar to member 102.

It can be seen from the foregoing description that the basket attachment 10 of the present invention fulfills a multiplicity of objectives, some of which include an increase in the capacity of items capable of being carried by the shopping cart and combined basket attachment 10; a lightweight and yet rugged basket attachment which, is preferably formed of a plastic material, and wherein advertising and/or message information is provided as an integral part of the basket attachment which subject matter may be viewed from both the front and rear of the basket attachment, said basket attachment 10 being provided with integrally formed bumper portions which protect the front and rear of the sign from being damaged or scratched; and simplified, easy to use, fastening means for joining the upper and lower horizontally aligned ribs of the basket attachment to cooperating ribs of a shopping cart to stably mount the basket attachment to the shopping cart and including integrally formed recesses provided for receiving hooks which secure the upper end of the basket attachment to the shopping cart and which prevent the hooks from twisting or swinging, still further stabilizing the mounting of the basket attachment to a shopping cart.

As was mentioned hereinabove, the basket member of the present invention may be molded of a suitable plastic by a single molding operation. The basket attachment may preferably be formed of polyethylene, which is substantially unaffected by cold temperatures and hence holds up extremely well, especially for basket attachments which are used and/or stored out of doors.

Figure 4:
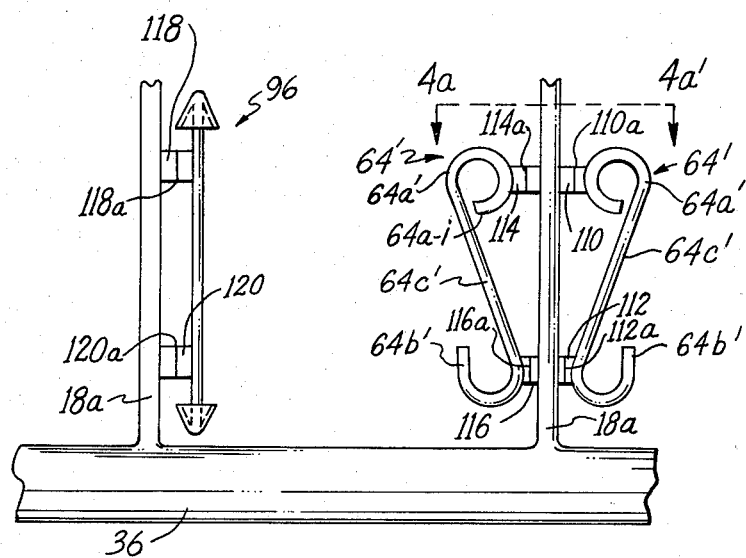
FIG. 4 is a sectional view of a portion of the rear wall of the basket of FIG. 1 showing another embodiment of the present invention.
Figure 4A:
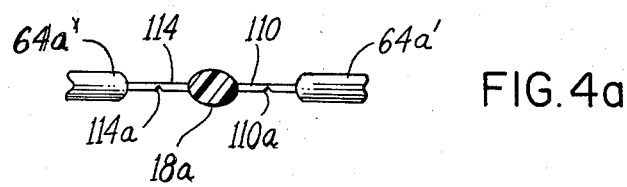
FIG. 4a is an end view of the tearaway elements looking in the direction of arrows 4a—4a' in FIG. 4.

Forming the basket attachment of plastic further enables the retainer element and S-shaped mounting hooks to be integrally formed with the molding of the basket attachment 10. Noting for example, FIGS. 4 and 4a, vertically aligned ribs 18a forming party of rear wall 18, shown best, for example, in FIG. 1, have integrally joined thereto a pair of S-shaped mounting hooks 64', 64', said S-shaped mounting hooks 64, 64' being formed of the same plastic material as the basket and being joined to right-hand rib 18a by extremely thin tear away webs 110, 112, 114, 116, respectively. FIG. 4a shows the manner in which extremely thin webs 110 and 114 integrally join upper hook portions 64a', 64a' to vertically aligned rib 18a. Lower ribs 112 and 116 are also extremely thin so as to be easily torn away or cut away from the S-shaped hooks 64', 64'. Since mounting hooks 64', 64' are formed of plastic, their free ends 64a'-1 and 64b'-1 are preferably in close proximity to the straight central portion 64c'. The upper hook portions 64a' may thus be joined to the upper horizontal rib 66 (see FIGS. 1a and 1c) by pulling the free end 64a'-1 outwardly and away from the straight central portion 64c', placing the hook shaped portion 64a' around the horizontally aligned rib 66 of the shopping cart and then releasing the free end 64a-1' causing it to return to its normal position in close proximity to the straight central portion 64c'.

The plastic retainer 96 is similarly joined to the left-hand vertically aligned rib 18a by extremely thin webs 118, 120. The webs 110 through 120 are sufficiently thin to permit the mounting hooks 64' and the retainer 96 to be cut away or torn away from the associated vertically aligned ribs 18. In addition, the extremely thin webs may be scored as represented by the score lines 110a and 114a as shown in FIG. 4a to further facilitate the tearing away of the members 64' and 96 from the rib 18a of basket attachment 10 preparatory to assembly thereof. This arrangement greatly simplifies handling and packaging and assures that all of the components are shipped together without fear of becoming misplaced. The tear away webs are thick enough to retain the elements 64' and 96 to the basket attachment and yet thin enough to permit their being easily cut or torn away preparatory to assembly.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A basket attachment for releasable mounting to shopping carts and the like comprising a one-piece basket structure formed of a plastic material and having continuous sidewalls joined at their lower ends to a floor;

each of said sidewalls and said floor having an open network configuration formed by first and second groups of transversely aligned ribs, said first ribs being integrally joined to said second ribs at their intersections;

said basket structure having an open upper end;

one wall of said basket structure having an open region defined by a pair of substantially vertically aligned ribs;

a substantially planar sheet arranged to receive advertising and/or message material on both the front and rear surfaces thereof;

said pair of ribs each having recess means for slidably receiving opposing edges of said sheet whereby said sheet fills the aforesaid open region between said pair of ribs;

the exterior surfaces of said pair of ribs extending outwardly and away from said wall to protect the sheet slidably received therebetween against damage;

an inclined ramp extending across the bottom marginal portion of said planar sheet for normally urging items placed in said basket attachment away from the interior surface of said planar sheet.

2. A basket attachment for releasable mounting to shopping carts and the like comprising a one-piece basket structure formed of a plastic material and having continuous sidewalls joined at their lower ends to a floor;

each of said sidewalls and said floor having an open network configuration formed by first and second groups of transversely aligned ribs, said first ribs being integrally joined to said second ribs at their intersections;

said basket structure having an open upper end;

one wall of said basket structure having an open region defined by a pair of substantially vertically aligned ribs;

a substantially planar sheet arranged to receive advertising and/or message material on both the front and rear surfaces thereof;

said pair of ribs each having recess means for slidably receiving opposing edges of said sheet whereby said sheet fills the aforesaid open region between said pair of ribs;

the exterior surfaces of said pair of ribs extending outwardly and away from said wall to protect the sheet slidably received therebetween against damage;

hook means for securing said basket attachment to the horizontal rib of a shopping cart and having a first hooked end supported by the horizontal rib of the shopping cart and a second hooked end;

one of said basket attachment walls having a ledge provided with an opening along the underside thereof;

recess means communicating with the underside of said ledge and receiving the portion of said hook means intermediate said hooked ends to prevent the hook means from experiencing any twisting or swinging when one of said hooked ends is hooked about the horizontal bar of the shopping cart while the remaining one of said hooked ends is inserted into said downwardly extending opening, thereby stably mounting the basket attachment to the shopping cart.

3. The basket attachment of claim 2 wherein said recess means comprises an L-shaped recess having a first recess portion for receiving the intermediate portion of said hook means and having a second portion thereof arranged beneath said downwardly extending opening facilitating the insertion of one of said hooked ends into said opening.

4. The basket attachment of claim 3 wherein the width of said recess means is slightly greater than the width of the portion of the hook means received by said recess means.

* * * * *